(12) United States Patent
McMillan

(10) Patent No.: US 8,038,408 B2
(45) Date of Patent: Oct. 18, 2011

(54) COMPOSITE AEROFOIL

(75) Inventor: Alison J. McMillan, Uttoxeter (GB)

(73) Assignee: Rolls-Royce plc, London, England ( * ) Notice: Subject to any disclaimer, the term of this patent is extended or adjusted under 35 U.S.C. 154(b) by 1726 days.

(21) Appl. No.: 11/262,781

(22) Filed: Nov. 1, 2005

(65) Prior Publication Data

US 2006/0275132 A1    Dec. 7, 2006

(30) Foreign Application Priority Data

Nov. 5, 2004 (GB) .................................. 0424481.0

(51) Int. Cl.
*B32B 5/02* (2006.01)
*B64C 27/46* (2006.01)
*D03D 11/00* (2006.01)

(52) U.S. Cl. ............... 416/230; 416/227 R; 416/229 R; 416/232; 442/178

(58) Field of Classification Search ........................ None
See application file for complete search history.

(56) References Cited

U.S. PATENT DOCUMENTS

| | | | |
|---|---|---|---|
| 5,127,802 A | 7/1992 | Carlson | |
| 5,222,297 A | 6/1993 | Graff | |
| 5,350,545 A * | 9/1994 | Streckert et al. ........... | 156/89.27 |
| 5,382,453 A | 1/1995 | Mason | |
| 5,403,153 A | 4/1995 | Goetze | |
| 5,534,354 A | 7/1996 | Gregg | |
| 5,632,602 A | 5/1997 | Herrmann | |
| 7,118,346 B2 * | 10/2006 | Read ............................ | 416/232 |
| 2003/0059577 A1 | 3/2003 | Morrison | |
| 2003/0129061 A1 | 7/2003 | Finn | |

FOREIGN PATENT DOCUMENTS

| | | |
|---|---|---|
| GB | 458789 A | 12/1936 |
| GB | 2261032 A | 5/1993 |
| JP | 63278827 A | 11/1988 |
| JP | 04308251 AB | 10/1992 |
| JP | 06257404 AB | 9/1994 |
| JP | 07156144 A | 6/1995 |

OTHER PUBLICATIONS

European Search Report (dated May 12, 2010) and Written Opinion corresponding to the corresponding European application.

* cited by examiner

*Primary Examiner* — Angela Ortiz
*Assistant Examiner* — Camie Thompson
(74) *Attorney, Agent, or Firm* — Jeffrey S. Melcher; Manelli Selter PLLC

(57) ABSTRACT

A composite blade (26) comprises a three-dimensional arrangement of reinforcing fibres (58) and a matrix material (60) infiltrated around the three-dimensional arrangement of woven reinforcing fibres (60). The three-dimensional arrangement of woven reinforcing fibres (58) defines a plurality of cavities (56) within the aerofoil (28). The composite blade (26) comprises an aerofoil portion (38) and a root portion (36). The aerofoil portion (38) comprises a leading edge (44), a trailing edge (46), a concave pressure surface wall (50), a convex suction surface wall (52) and a tip (48). The aerofoil portion (36) comprises a plurality of webs (54) extending between, and being secured to, the concave pressure surface wall (50) and the convex suction surface wall (52) to produce a Warren girder structure. The three-dimensional arrangement of woven reinforcing fibres (58) are arranged to produce the concave pressure surface wall (50), the convex suction surface wall (52) and the plurality of webs (54). The matrix material (60) is an organic resin and the reinforcing fibres (58) comprise carbon fibres.

17 Claims, 5 Drawing Sheets

COMPOSITE AEROFOIL

CROSS-REFERENCE TO RELATED APPLICATIONS

This application claims priority to GB 0424481.0, filed 11 Nov. 2004.

FIELD OF THE INVENTION

The present invention relates to a composite aerofoil, in particular to a composite fan blade, for a gas turbine engine.

BACKGROUND OF THE INVENTION

Conventionally compressor blades, or fan blades, comprise forged, or machined, solid metal.

One problem with conventional solid low-pressure compressor blades, or fan blades, is that they are relatively heavy in weight due to their size. The gas turbine engines to which these fan blades are secured require that the rotor disc is made sufficiently strong to carry the operational loads of the fan blades and this entails strengthening the rotor disc and as such means increasing the mass and weight of the rotor disc. In addition the gas turbine engines to which these fan blades are secured require that the fan casing containment system is sufficiently strong to contain a fan blade should it become detached due to bird ingestion and as such means increasing the mass and weight of the fan casing. Thus these features add to the weight of the gas turbine engine.

In order to reduce the weight of large compressor blades, e.g. low-pressure compressor blades or fan blades, it is known for the fan blade to comprise a number of metal workpieces, which are diffusion bonded together with an intervening honeycomb structure to produce a hollow fan blade. This reduces the weight of the fan blade and enables corresponding reductions in the weight in the rotor disc and fan casing containment system.

In order to reduce the weight of large compressor blades, e.g. low-pressure compressor blades or fan blades, it is known for the fan blade to comprise a number of metal workpieces, which are diffusion bonded together and superplastically formed to produce a hollow fan blade. This reduces the weight of the fan blade and enables corresponding reductions in the weight in the rotor disc and fan casing containment system.

Also in order to reduce the weight of small and large compressor blades, e.g. low-pressure compressor blades or fan blades, it is known for the fan blade to comprise a composite material, for example fibre, or cloth, reinforced resin. It is also known for the composite material fan blade to comprise metal parts. This also reduces the weight of the fan blade and enables corresponding reductions in weight in the rotor disc and fan casing containment system.

However, a low-pressure compressor blade, or fan blade, comprising composite material has substantially the same weight as a hollow low-pressure compressor blade, or hollow fan blade, comprising a number of metal workpieces, which are diffusion bonded together and superplastically formed.

SUMMARY OF THE INVENTION

Accordingly one aspect of the present invention seeks to provide a novel composite compressor blade.

Accordingly one aspect of the present invention provides a composite aerofoil comprising a three-dimensional arrangement of reinforcing fibres and a matrix material infiltrated around the three-dimensional arrangement of woven reinforcing fibres, and wherein the three-dimensional arrangement of woven reinforcing fibres defining at least one cavity within the aerofoil.

Additionally in accordance with an aspect of the present invention there is provided a composite aerofoil comprising a leading edge, a trailing edge, a concave pressure surface wall, a converse suction surface wall and a tip, the composite aerofoil comprising a three-dimensional arrangement of woven reinforcing fibres and a matrix material infiltrated around the three-dimensional arrangement of woven reinforcing fibres, the three-dimensional arrangement of woven reinforcing fibres defining a plurality of cavities, the plurality of cavities being spaced apart between the leading edge and the trailing edge. The composite aerofoil comprising at least one web extending between, and being secured to, the concave pressure surface wall and the convex suction surface wall to produce a Warren girder structure, the three-dimensional arrangement of woven reinforcing fibres being arranged to produce the concave pressure surface wall, the convex suction surface wall and at least one web to produce the Warren girder structure.

Possibly the three-dimensional arrangement of woven reinforcing fibres defines a plurality of cavities.

Possibly the aerofoil is secured to a root.

The root may comprise a three-dimensional arrangement of woven reinforcing fibres and a matrix infiltrated around the three-dimensional arrangement of woven reinforcing fibres. The three-dimensional arrangement of woven reinforcing fibres in the aerofoil extend into and form the three-dimensional arrangement of woven reinforcing fibres in the root.

The root may comprise a metal member.

Possibly the aerofoil comprises a leading edge, a trailing edge, a concave pressure surface wall, a convex suction surface wall and a tip.

Possibly the at least one cavity is arranged within the aerofoil.

Possibly the plurality of cavities is spaced apart between the leading edge and the trailing edge.

Possibly the aerofoil comprises a plurality of webs extending between, and being secured to, the concave pressure surface wall and the convex suction surface wall to produce a Warren girder structure.

Possibly the webs extending longitudinally of the aerofoil from adjacent the root to adjacent the tip.

Possibly the three-dimensional arrangement of woven reinforcing fibres are arranged to produce the concave pressure surface wall, the convex suction surface wall and the plurality of webs to produce the Warren girder structure.

Possibly the matrix material is a resin. Preferably the matrix material is an organic resin. Possibly the reinforcing fibres comprise carbon fibres. Alternatively the matrix material may be a metal or alloy. Alternatively the reinforcing fibres may be silicon carbide, silicon nitride or boron.

Possibly the at least one cavity is hollow. Alternatively the at least one cavity is filled with a low-density material. The low-density material may be a foamed adhesive.

Possibly the at least one cavity may be defined by a hollow member arranged within the aerofoil. The hollow member may be rigid or resilient. The hollow member may be filled with a foamed adhesive.

Possibly the aerofoil is a fan blade, a fan outlet guide vane, a compressor blade, a compressor vane, a propeller blade, a helicopter blade, a ship propeller blade or a wind turbine blade.

One aspect of the present invention also provides a novel method of manufacturing a composite aerofoil.

Accordingly one aspect of the present invention provides a method of manufacturing a composite aerofoil comprising weaving a three-dimensional arrangement of reinforcing fibres, the three-dimensional arrangement of woven reinforcing fibres defining at least one cavity within the aerofoil, infiltrating a matrix material around the three-dimensional arrangement of woven reinforcing fibres.

Further, in accordance with an aspect of the present invention there is provided a composite aerofoil comprising a leading edge, a trailing edge, a concave pressure surface wall, a converse suction surface wall and a tip, the composite aerofoil comprising a three-dimensional arrangement of woven reinforcing fibres and a matrix material infiltrated around the three-dimensional arrangement of woven reinforcing fibres, the three-dimensional arrangement of woven reinforcing fibres defining a plurality of cavities, the plurality of cavities being spaced apart between the leading edge and the trailing edge, the composite aerofoil comprising at least one web extending between, and being secured to, the concave pressure surface wall and the convex suction surface wall to produce a Warren girder structure, the three-dimensional arrangement of woven reinforcing fibres being arranged to produce the concave pressure surface wall, the convex suction surface wall and at least one web to produce the Warren girder structure and infiltrating a matrix material around the three-dimensional arrangement of woven reinforcing fibres.

The method may comprise placing the woven three-dimensional arrangement of reinforcing fibres in a mould, inserting at least one mandrel into the at least one cavity within the aerofoil and infiltrating the matrix material around the three-dimensional arrangement of woven reinforcing fibres, within the mould and around the at least one mandrel.

The method may comprises placing at least one rigid hollow member within the woven three-dimensional arrangement of reinforcing fibres while the woven three-dimensional arrangement of reinforcing fibres is on a loom, placing the woven three-dimensional arrangement of reinforcing fibres and the at least one rigid hollow member in a mould and infiltrating the matrix material around the three-dimensional arrangement of woven reinforcing fibres, within the mould and around the at least one rigid hollow member.

The method may comprises placing at least one flexible hollow member within the woven three-dimensional arrangement of reinforcing fibres while the woven three-dimensional arrangement of reinforcing fibres is on a loom, the flexible hollow member containing a thermally expandable material, placing the woven three-dimensional arrangement of reinforcing fibres and the at least one flexible hollow member in a mould and infiltrating the matrix material around the three-dimensional arrangement of woven reinforcing fibres, within the mould and around the at least one flexible hollow member.

The method may comprise weaving at least one tape of thermally expandable material into the three-dimensional arrangement of woven reinforcing fibres.

Possibly the matrix material is a resin. Preferably the matrix material is an organic resin. Preferably the reinforcing fibres comprise carbon fibres.

Possibly the method comprises heating and pressurising the matrix material to consolidate and cure the composite material.

The thermally expandable material comprises adhesive foam.

Possibly the aerofoil is a fan blade, a fan outlet guide vane, a compressor blade, a compressor vane, a propeller blade, a helicopter blade, a ship propeller blade or a wind turbine blade.

BRIEF DESCRIPTION OF THE DRAWINGS

An aspect of the present invention will be more fully described by way of example with reference to the accompanying drawings in which.

DETAILED DESCRIPTION OF THE INVENTION

Figure 1:
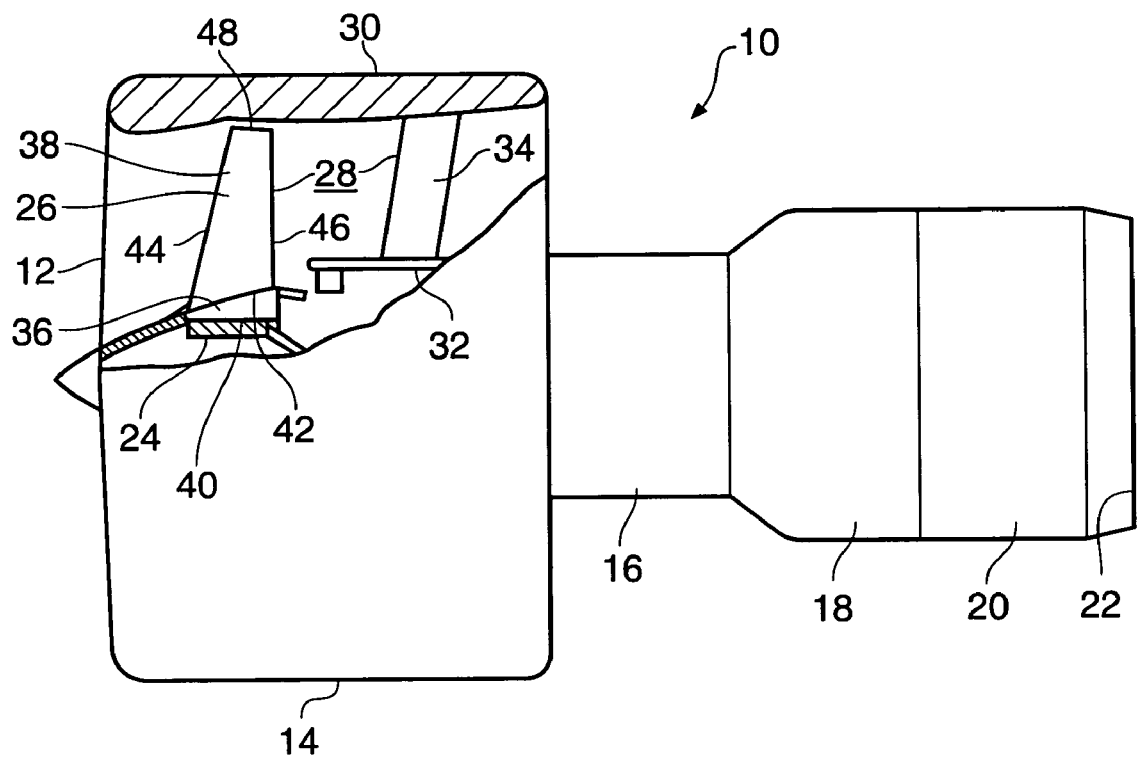
FIG. 1 is partially cut away view of a gas turbine engine having a fan blade according to aspects of the present invention.

A turbofan gas turbine engine 10, as shown in FIG. 1, comprises in flow series an inlet 12, a fan section 14, a compressor section 16, a combustion section 18, a turbine section 20 and an exhaust 22. The fan section 14 comprises a fan rotor 24 carrying a plurality of circumferentially spaced radially outwardly extending fan blades 26. The fan blades 26 are arranged in a bypass duct 28 defined by a fan casing 30, which surrounds the fan rotor 24 and fan blades 26. The fan casing 30 is secured to a core engine casing 32 by a plurality of circumferentially spaced radially extending fan outlet guide vanes 34. The fan rotor 24 and fan blades 26 are arranged to be driven by a turbine (not shown) in the turbine section 20 via a shaft (not shown). The compressor section 16 comprises one or more compressors (not shown) arranged to be driven by one or more turbines (not shown) in the turbine section 20 via respective shafts (not shown).

Figure 3:
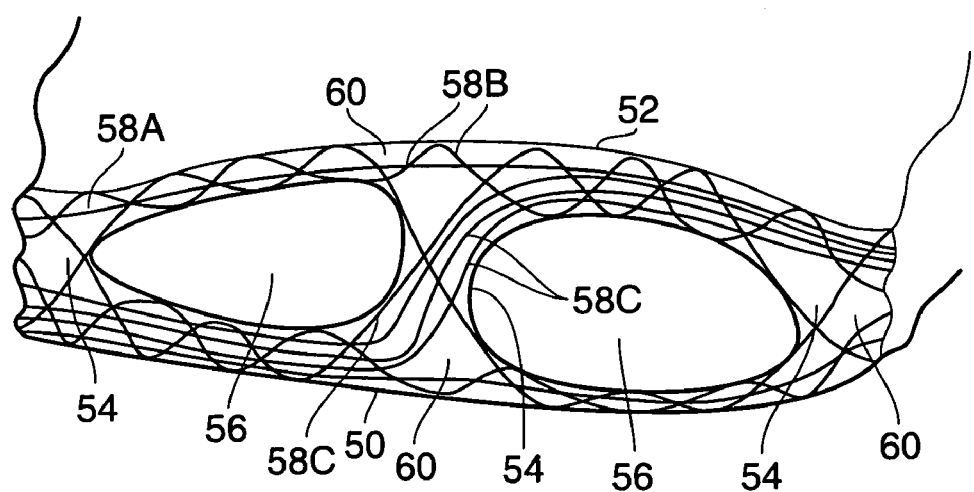
FIG. 3 is a further enlarged cross-sectional view through the fan blade along the line A-A shown in FIG. 2.
Figure 2:
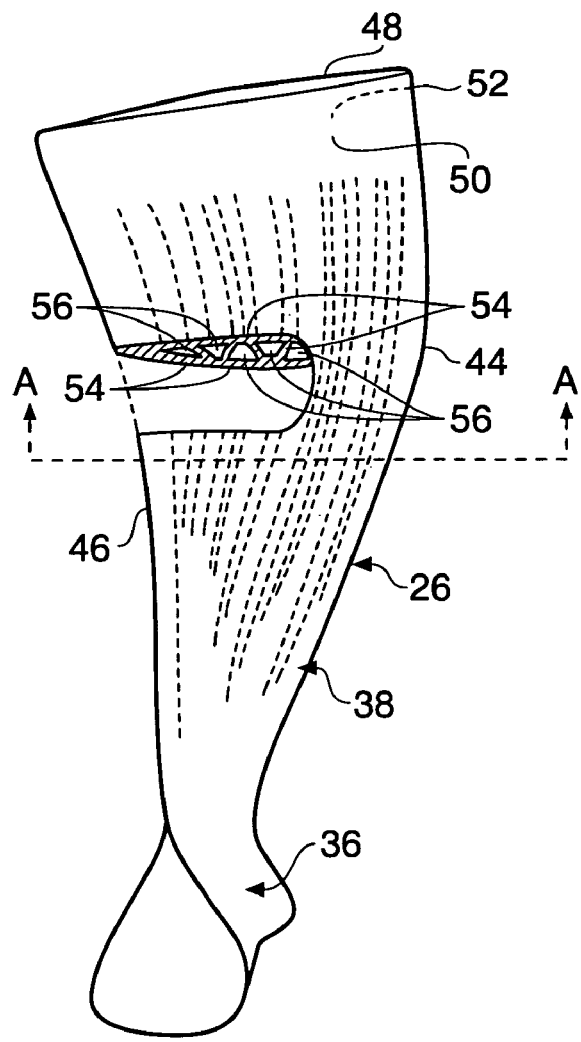
FIG. 2 shows an enlarged partially cut away perspective view of a fan blade according to aspects of the present invention.

A fan blade 26 according to aspects of the present invention is shown more clearly in FIGS. 2 and 3. The fan blade 26 comprises a root portion 36 and an aerofoil portion 38. The root portion 36 is arranged to locate in a slot 40 in the rim 42 of the fan rotor 24, as shown in FIG. 1, and for example the root portion 36 may be dovetail shape, or firtree shape, in cross-section and hence the corresponding slot 40 in the rim 42 of the fan rotor 24 is the same shape. The aerofoil portion 38 has a leading edge 44, a trailing edge 46 and a tip 48 remote from the root portion 36 and the fan rotor 24. A concave pressure surface wall 50 extends from the leading edge 44 to the trailing edge 46 and a convex suction surface wall 52 extends from the leading edge 44 to the trailing edge 46.

The aerofoil portion 38 of the fan blade 26 is hollow and comprises a plurality of webs 54, which extend between, and are secured to, the concave pressure surface wall 50 and the convex suction surface wall 52 in order to define a plurality of cavities 56. The plurality of cavities 56 and the plurality of webs 54 are spaced apart between the leading edge 44 and the trailing edge 46. The webs 54 extend longitudinally of the aerofoil portion from adjacent the root portion 36 to adjacent the tip 48. The arrangement of the concave pressure surface wall 50, the convex suction surface wall 52 and webs 54 form a Warren girder structure.

Figure 4:
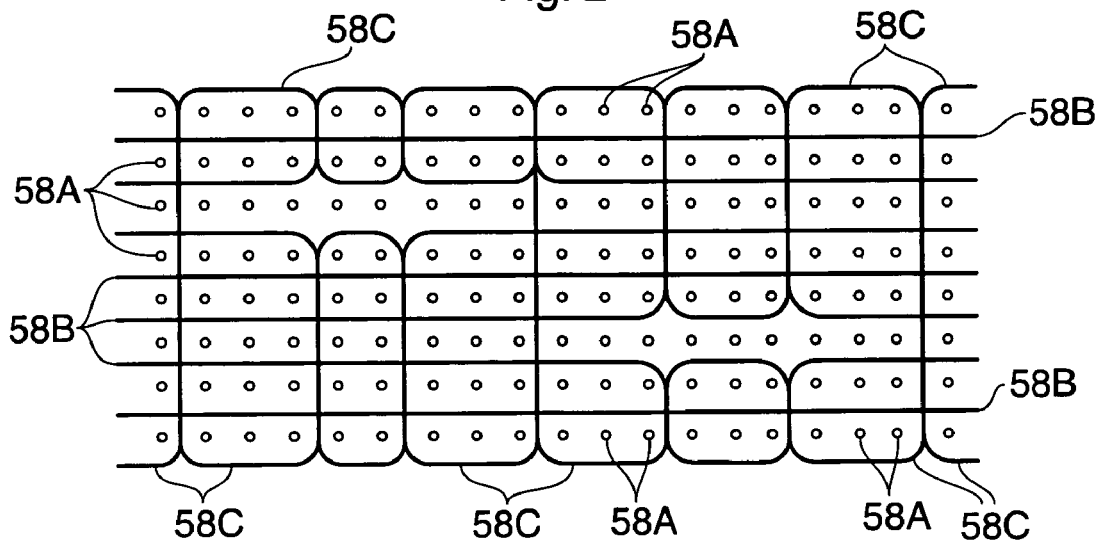
FIG. 4 is a sectional view of a portion of a preform of three-dimensional arrangement of woven reinforcing fibres used in the fan blade prior to infiltration of a matrix material.

The fan blade 26 comprises a three-dimensional arrangement of woven reinforcing fibres 58 and a matrix material 60 infiltrated around the three-dimensional arrangement of woven reinforcing fibres 58. The three-dimensional arrangement of woven reinforcing fibres 58 and matrix material 60 define the cavities 56 within the fan blade 26. In particular the three-dimensional arrangement of woven reinforcing fibres 58 and the matrix material 60 form the concave pressure surface wall 50, the convex suction surface wall 52 and the webs 54. Thus the reinforcing fibres 58 are arranged within the concave pressure surface wall 50, the convex suction surface wall 52 and the webs 54. A first set of the reinforcing fibres 58A extend generally longitudinally of the fan blade 26 from the root portion 36 to the tip 48, a second set of the reinforcing fibres 58B extend generally chordally of the fan blade 26 from the leading edge 44 to the trailing edge 46 and a third set of the reinforcing fibres 58C which have portions which extend generally chordally of the fan blade 26 and which have portions which extend transversely to the first and second sets of reinforcing fibres 58A and 58B. The third set of reinforcing fibres 58C cross and interlock with the first and second set of reinforcing fibres 58A and 58B to, bind the three-dimensional arrangement of reinforcing fibres 58 together. FIG. 4 shows one three-dimensional arrangement of woven reinforcing fibres in a preform prior to infiltration with a matrix material. This arrangement is known as orthogonal interlock because the reinforcing fibres 58C are perpendicular to the reinforcing fibres 58A and 58B. However, the reinforcing fibres 58C are really only a special case of the reinforcing fibres 58B.

The three-dimensional arrangement of woven reinforcing fibres 58 are arranged to produce the concave pressure surface wall 50, the convex suction surface wall 52 and the plurality of webs 54 to produce the Warren girder structure.

The matrix material 60 may be a resin, for example the matrix material 60 is an organic resin and the reinforcing fibres 58 may comprise carbon fibres, glass fibres, Kevlar® fibres or other suitable fibres. The matrix material 60 may be a metal, or alloy, and the reinforcing fibres 58 may be silicon carbide, silicon nitride or boron.

Figure 5:
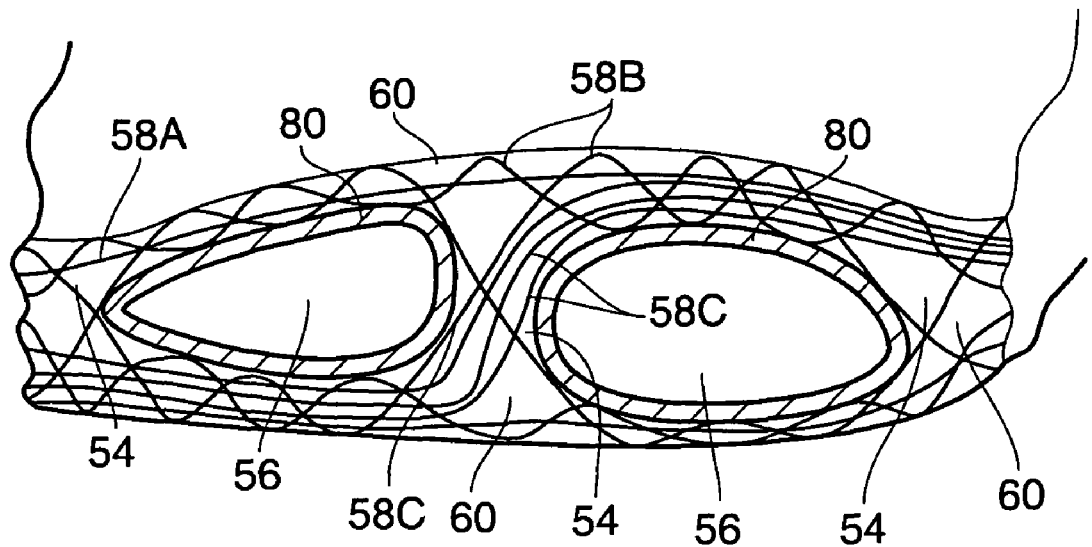
FIG. 5 is an alternative further enlarged cross-sectional view through the fan blade along the line A-A in FIG. 2.

In an alternative embodiment, as shown in FIG. 5, at least one, preferably a respective hollow member 80, is arranged within the aerofoil portion 38 which defines each of the cavities 56. The hollow member 80 is rigid.

Figure 6:
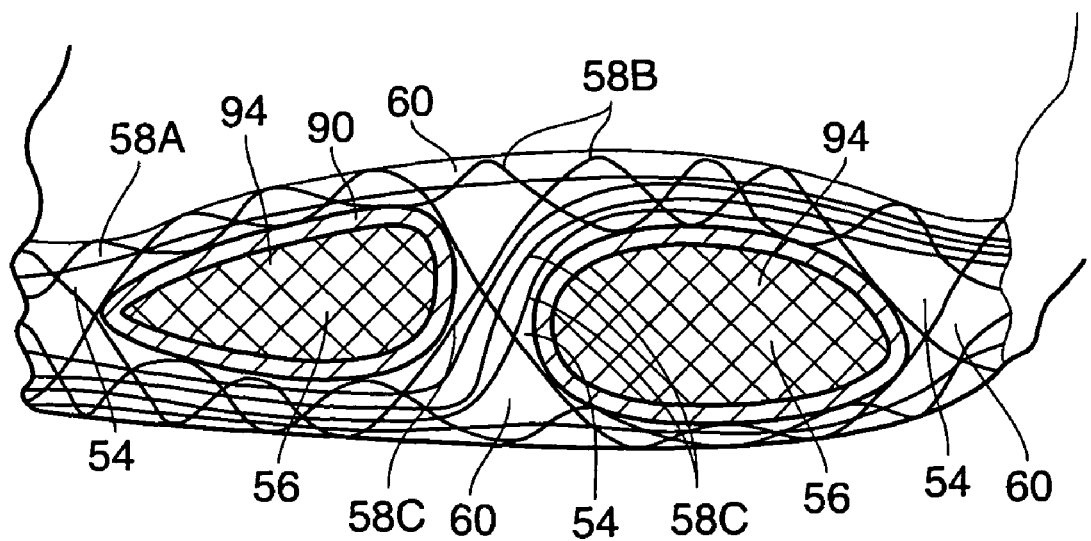
FIG. 6 is another further enlarged cross-sectional view through the fan blade along the line A-A in FIG. 2.

In a further embodiment, as shown in FIG. 6, at least one, preferably each, of the cavities 56 is defined by a respective hollow member 90 arranged within the aerofoil portion 38. The hollow member 90 is flexible. The at least one cavity 56 is filled with a low-density material 94. The low-density material may be a foamed adhesive.

Figure 7:
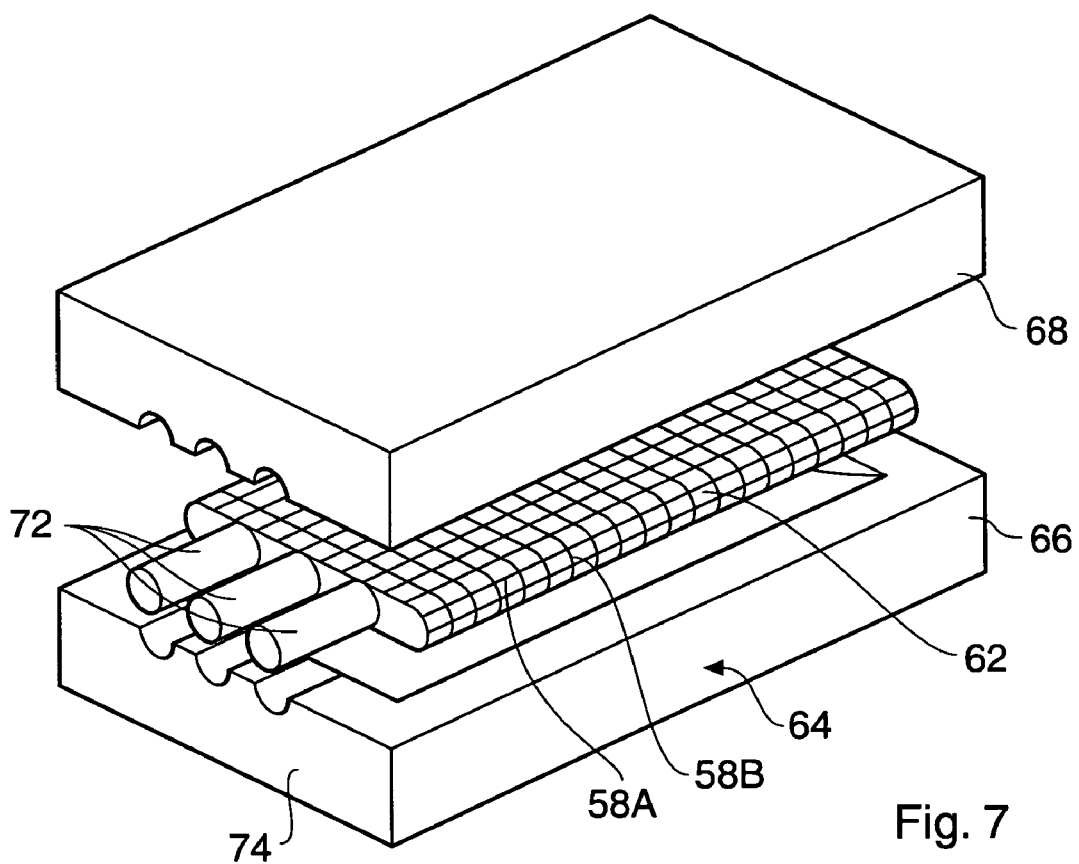
FIG. 7 is a view of a preform of a three-dimensional arrangement of woven reinforcing fibres and mould used in a first method of manufacturing a fan blade according to aspects of the present invention.

In a first method of manufacturing the fan blade 26, as shown in FIG. 7, a preform 62 comprising the three-dimensional arrangement of woven reinforcing fibres 58 is placed in a mould 64 defining the external shape of the fan blade 26. The mould 64 comprises two mould halves 66 and 68 and the mould 64 also comprises a plurality of mandrels 72, which extend into the mould 64 from an end 74 of the mould 70 corresponding to the tip 48, or root portion 36, of the fan blade 26. The mandrels 72 also extend into the cavities defined within the preform 62 of the three-dimensional arrangement of reinforcing fibres 58. The mandrels 72 have a constant, or tapering, cross-section to allow subsequent removal of the mandrels 72. A resin is injected into the mould 64 and the resin infiltrates around the three-dimensional arrangement of woven reinforcing fibres 58 and fills the volume around the reinforcing fibres 58 and between the mould 64 and the mandrels 72. The mould 64 is heated and pressurised in an autoclave to cure the resin to form the matrix material 60 around the three-dimensional arrangement of woven reinforcing fibres 58. The mould 64 defines the exterior shapes of the concave pressure surface wall 50 and the convex suction surface wall 52 of the fan blade 26 and the mandrels 72 define the shapes of the cavities 56. The completed fan blade 26 is removed from the mould 64 and the mandrels 72 are removed from the fan blade 26. The ends of the cavities 56 are then closed.

Figure 8:
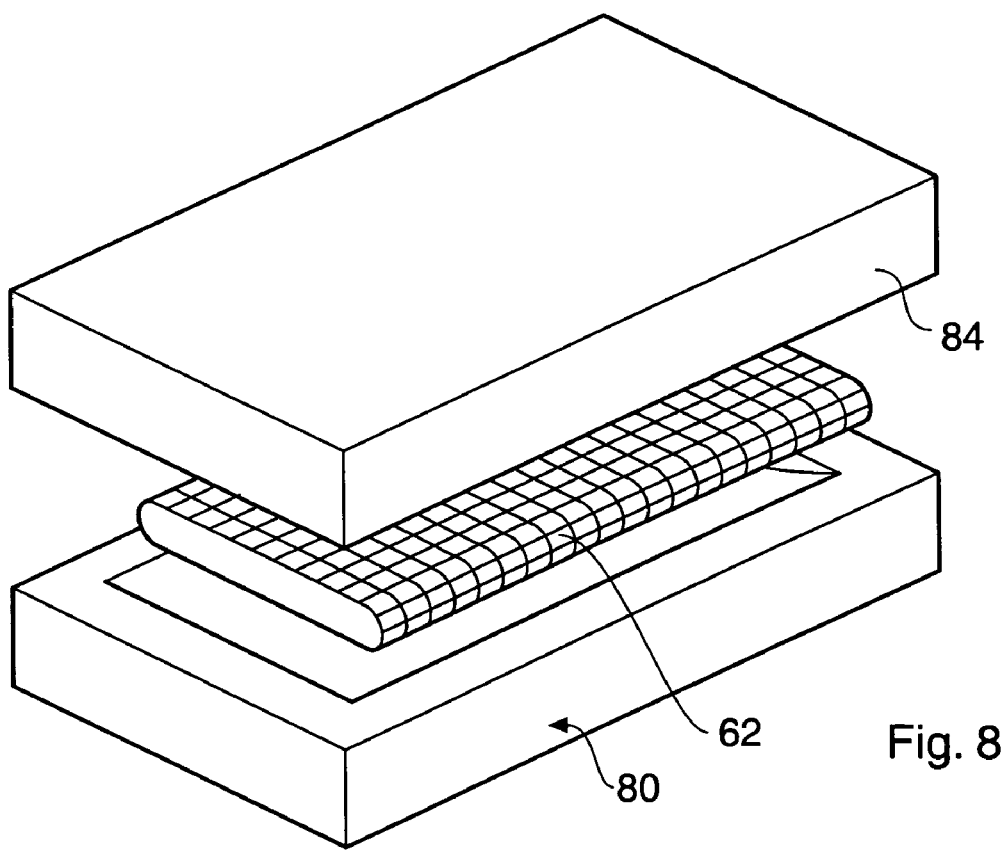
FIG. 8 is a view of a preform of a three-dimensional arrangement of woven reinforcing fibres and mould used in a second method of manufacturing a fan blade according to aspects of the present invention.

In a second method of manufacturing the fan blade 26, as shown in FIG. 8, while a preform 62 of the three-dimensional arrangement of woven reinforcing fibres 58 is on the loom, a number of rigid hollow members 80 are positioned within the cavities in the preform comprising the three-dimensional arrangement of woven reinforcing fibres 58 and the weave may be closed around the rigid hollow members 80. The preform comprising the three-dimensional arrangement of woven reinforcing fibres 58 is placed in a mould 82 defining the external shape of the fan blade 26. The mould 82 comprises mould halves 84 and 86. A resin is injected into the mould 82 and the resin infiltrates around the three-dimensional arrangement of woven reinforcing fibres 58 and fills the volume around the reinforcing fibres 58 and between the mould 82 and the rigid hollow members 80. The mould 82 is heated and pressurised in an autoclave to cure the resin to form the matrix material 60 around the three-dimensional arrangement of woven reinforcing fibres 58. The mould 82 defines the exterior shapes of the concave pressure surface wall 50 and the convex suction surface wall 52 of the fan blade 26 and the rigid hollow members 80 define the shapes of the cavities 56. The completed fan blade 26 is removed from the mould 82 and the rigid hollow members 80 are retained in the fan blade 26.

The rigid hollow members 80 must be capable of withstanding the temperatures and pressures applied in the autoclave. The rigid hollow members 80 may have varying cross-section areas and hence enable much greater variation in the shapes of the cavities 54 in the fan blade 26. The preform has enough elasticity to allow the rigid hollow members 80 to be inserted. The rigid hollow members 90 are sealed.

The main advantage of this method is that the three-dimensional arrangement of woven reinforcing fibres 58 and the matrix material 60 completely enclose rigid hollow members 80 and there is no need to close apertures in the finished fan blade 26.

In a third method of manufacturing the fan blade 26, as shown in FIG. 8, while a preform of the three-dimensional arrangement of woven reinforcing fibres 58 is on the loom, a number of flexible hollow members 90 are positioned within the cavities in the preform comprising the three-dimensional arrangement of woven reinforcing fibres 58 and the weave is closed around the flexible hollow members 90. Each of the flexible hollow members 90 is provided with a predetermined, measured, quantity/volume of foaming material e.g. a foaming adhesive, for example Hysol BMI, trade name, compatible foaming adhesive. The preform comprising the three-dimensional arrangement of woven reinforcing fibres 58 is placed in a mould 82 defining the external shape of the fan blade 26. A resin is injected into the mould 82 and the resin infiltrates around the three-dimensional arrangement of woven reinforcing fibres 58 and fills the volume around the reinforcing fibres 58 and between the mould 82 and the flexible hollow members 90. The mould 82 is heated and pressurised in an autoclave to cure the resin to form the matrix material 60 around the three-dimensional arrangement of woven reinforcing fibres 58. During the curing process the adhesive foams by a given factor of its initial volume and provides an internal hydrostatic pressure to help consolidate the interior of the fan blade 26. The mould 82 defines the exterior shapes of the concave pressure surface wall 50 and the convex suction surface wall 52 of the fan blade 26 and the flexible hollow members 90 define the shapes of the cavities 56. The completed fan blade 26 is removed from the mould 82 and the flexible hollow members 90 are retained in the fan blade 26 together with the adhesive foam 94.

The advantage of this method is that the flexible hollow member 90 it is easier to insert into the preform and it may be treated in the loom as a warp. The flexible hollow members 90 may have varying cross-sectional areas and hence enable much greater variation in the shapes of the cavities 54 in the fan blade 26. The flexible hollow members 90 are sealed.

The main advantage of this method is that the three-dimensional arrangement of woven reinforcing fibres 58 and the matrix material 60 completely enclose flexible hollow members 90 and there is no need to close apertures in the finished fan blade 26. Another advantage is that the cavities 56 may be provided in a lattice pattern, instead of running longitudinally of the fan blade 26.

In a fourth method of manufacturing the fan blade 26 while a preform of the three-dimensional arrangement of woven reinforcing fibres 58 is produced on the loom, one or more tapes of foaming material are woven into the preform as a warp, or weft, element and the tapes of foaming material are positioned in the preform comprising the three-dimensional arrangement of woven reinforcing fibres 58 where cavities are required. The tapes of foaming material e.g. foaming adhesive may comprise for example Hysol BMI, trade name, compatible foaming adhesive. The preform comprising the three-dimensional arrangement of woven reinforcing fibres 58 is placed in a mould 82 defining the external shape of the fan blade 26. A resin is injected into the mould 82 and the resin infiltrates around the three-dimensional arrangement of woven reinforcing fibres 58 and fills the volume around the reinforcing fibres 58 and within the mould 82. The mould 82 is heated and pressurised in an autoclave to cure the resin to form the matrix material 60 around the three-dimensional arrangement of woven reinforcing fibres 58. During the curing process the adhesive foams on the tapes of foaming material by a given factor of it's initial volume and provides an internal hydrostatic pressure to help consolidate the interior of the fan blade 26 and to define the cavities 56. The mould 82 defines the exterior shapes of the concave pressure surface wall 50 and the convex suction surface wall 52 of the fan blade 26 and the foamed tape of foaming material define the shapes of the cavities 56. The completed fan blade 26 is removed from the mould 82 and the foamed tape of foaming material is retained in the fan blade 26.

Any three-dimensional weave of the tape of foaming material within the three-dimensional arrangement of woven reinforcing fibres is possible, as long as there is sufficient allowance for expansion of the foaming material during curing of the resin.

The advantage of this method is that it is not necessary to provide rigid or flexible hollow members within the preform to define the cavities.

Figure 9:
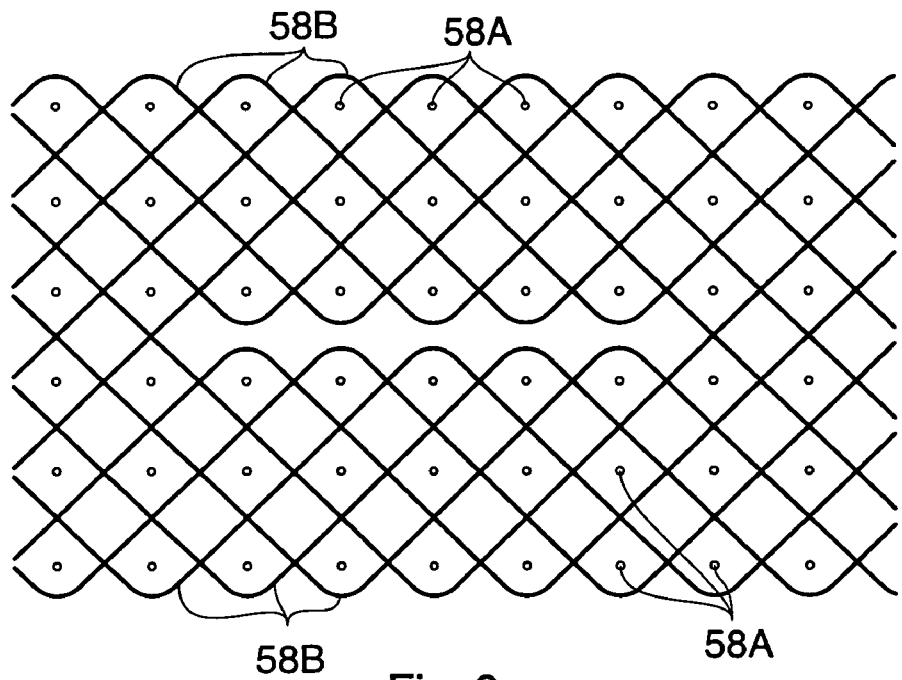
FIG. 9 is an alternative sectional view of a portion of a preform of three-dimensional arrangement of woven reinforcing fibres used in the fan blade prior to infiltration of a matrix material.

FIG. 9 shows an alternative three-dimensional arrangement of woven reinforcing fibres in a preform prior to infiltration with a matrix material. This arrangement is known as angle interlock because the reinforcing fibres 58C are angled to the reinforcing fibres 58A and 58B. However, the reinforcing fibres 58C are really only a special case of the reinforcing fibres 58B. This arrangement of reinforcing fibres may give a better resistance to bird, or other large object, impact.

In the examples described previously the root portion 36 of the fan blade 26 also comprises a three-dimensional arrangement of woven reinforcing fibres and a matrix infiltrated around the three-dimensional arrangement of woven reinforcing fibres. The three-dimensional arrangement of woven reinforcing fibres in the aerofoil portion 38 extend into and form the three-dimensional arrangement of woven reinforcing fibres in the root portion 36.

Figure 10:
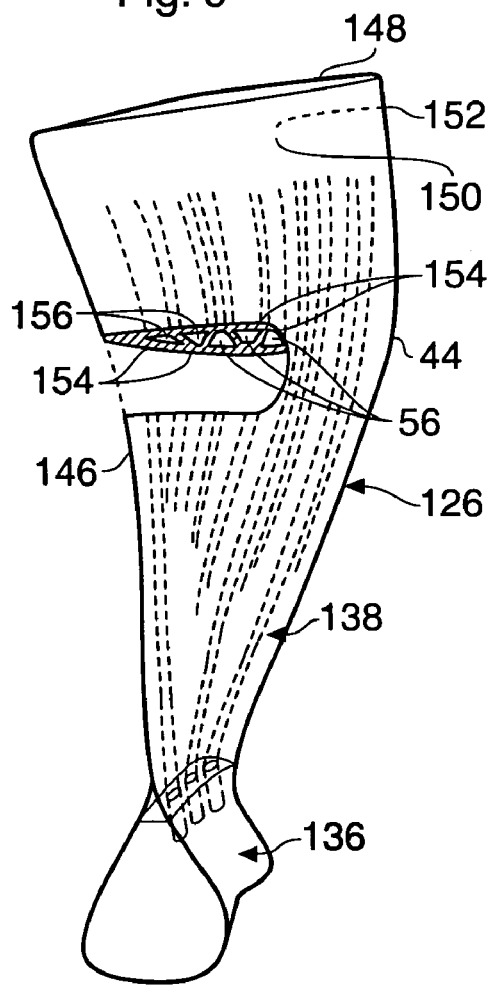
FIG. 10 shows an alternative enlarged partially cut away perspective view of a fan blade according to aspects of the present invention.

An alternative fan blade 126 according to aspects of the present invention is shown more clearly in FIG. 10. The fan blade 126 comprises a root portion 136 and an aerofoil portion 138. The root portion 136 is arranged to locate in a slot 40 in the rim 42 of the fan rotor 24, and for example the root portion 136 may be dovetail shape, or firtree shape, in cross-section and hence the corresponding slot 40 in the rim 42 of the fan rotor 24 is the same shape. The aerofoil portion 138 has a leading edge 144, a trailing edge 146 and a tip 148 remote from the root portion 136 and the fan rotor 24. A concave pressure surface wall 150 extends from the leading edge 144 to the trailing edge 146 and a convex suction surface wall 152 extends from the leading edge 144 to the trailing edge 146.

The aerofoil portion 138 of the fan blade 126 is hollow and comprises a plurality of webs 154, which extend between, and are secured to, the concave pressure surface wall 150 and the convex suction surface wall 152 in order to define a plurality of cavities 156. The plurality of cavities 156 and the plurality of webs 154 are spaced apart between the leading edge 144 and the trailing edge 146. The webs 154 extend longitudinally of the aerofoil portion from adjacent the root portion 136 to adjacent the tip 148. The arrangement of the concave pressure surface wall 150, the convex suction surface wall 152 and webs 154 form a Warren girder structure.

The fan blade 126 comprises a three-dimensional arrangement of woven reinforcing fibres 158 and a matrix material 160 infiltrated around the three-dimensional arrangement of woven reinforcing fibres 158. The three-dimensional arrangement of woven reinforcing fibres 158 and matrix material 160 define the cavities 156 within the fan blade 126. In particular the three-dimensional arrangement of woven reinforcing fibres 158 and the matrix material 160 form the concave pressure surface wall 150, the convex suction surface wall 152 and the webs 154. Thus the reinforcing fibres 158 are arranged within the concave pressure surface wall 150, the convex suction surface wall 152 and the webs 154.

The fan blade 126 differs in that the root portion 136 comprises metal, for example a titanium alloy, which has cavities 162, which interconnect with the cavities 156 in the aerofoil portion 138. The hollow rigid members 80 are secured to the root portion 136. The hollow rigid members 80 are inserted in the preform of the three-dimensional arrangement of woven reinforcing fibres 158 and they will not come out after the matrix material 160 is infiltrated around the reinforcing fibres 158. The hollow rigid members 80 may comprise a metal, for example a titanium alloy.

The fan blade 126 may be manufactured in a similar manner to those described above for the fan blade 26. However, in the first method the mandrels may be hollow rigid members, which are retained in the aerofoil portion 138 in order to secure the root portion 136. The hollow members may be provided with features, e.g. teeth, ridges or ribs extending transversely, chordally, of the aerofoil, to provide interlocking with the matrix material 160 or they may be tapered to increase in cross-section towards the tip of the aerofoil portion.

It may be necessary to provide some metal members into, or onto, the aerofoil portion of the fan blade for strengthening purposes. For example it may be necessary to provide a metal member around the leading edge, and possibly the trailing edge, of the aerofoil portion to reduce erosion of the leading edge of the fan blade.

One possible advantage of the present invention is that there is a reduction in weight of the fan blade compared to a fan blade comprising a number of metal workpieces diffusion bonded and superplastically formed and also relative to a fan blade comprising a composite material.

Another possible advantage of the present invention is that there is flexibility for positioning of the cavities within the fan blade so that the stiffness of the fan blade and hence the vibrational frequencies and modeshapes may be manipulated and/or controlled.

Although aspects of the present invention have been described with reference to a fan blade, a low-pressure compressor blade, the present invention is also applicable to other compressor blades. Aspects of the present invention are also applicable to fan outlet guide vanes or to compressor vanes. Aspects of the present invention are also applicable to integrally bladed rotors. Additionally aspects of the present invention are also applicable to propeller blades, helicopter blades, ship propeller blades or wind turbine blades. Thus generally aspects of the present invention are applicable to aerofoils or hydrofoils.

Aspects of the present invention are applicable to smaller compressor blades or compressor vanes simply by reducing the thread size. Typically in carbon fibre weaves 12 k tows are used, e.g. 12 thousand carbon fibres in the thread cross-section. The carbon fibre threads may have threads comprising 3 k tows or less.

The invention claimed is:

1. A method of manufacturing a composite aerofoil, the composite aerofoil comprising:
   a leading edge;
   a trailing edge;
   a concave pressure surface wall;
   a convex suction surface wall; and
   a tip,
   the method comprising:
   weaving a three-dimensional arrangement of reinforcing fibres, the three-dimensional arrangement of woven reinforcing fibres defining a plurality of cavities, the plurality of cavities being spaced apart between the leading edge and the trailing edge, the composite aerofoil comprising at least one web extending between, and being secured to, the concave pressure surface wall and the convex suction surface wall to produce a Warren girder structure, the three-dimensional arrangement of woven reinforcing fibres being arranged to produce the concave pressure surface wall, the convex suction surface wall and at least one web to produce the Warren girder structure; and
   infiltrating a matrix material around the three-dimensional arrangement of woven reinforcing fibres.

2. A method as claimed in claim 1 wherein the method comprises:
   placing at least one rigid hollow member within the woven three-dimensional arrangement of reinforcing fibres while the woven three-dimensional arrangement of reinforcing fibres is on a loom;
   placing the woven three-dimensional arrangement of reinforcing fibres and the at least one rigid hollow member in a mould; and
   infiltrating the matrix material around the three-dimensional arrangement of woven reinforcing fibres, within the mould and around the at least one rigid hollow member.

3. A method according to claim 2, wherein the aerofoil comprises a root, the root comprising a metal and the at least one hollow member comprising a metal, the method comprising securing the at least one rigid hollow member to the root.

4. A method as claimed in claim 1 wherein the method comprises:
   placing at least one flexible hollow member within the woven three-dimensional arrangement of reinforcing fibres while the woven three-dimensional arrangement of reinforcing fibres is on a loom, and providing a predetermined quantity of foaming material in the at least one flexible hollow member;
   placing the woven three-dimensional arrangement of reinforcing fibres and the at least one flexible hollow member in a mould; and
   infiltrating the matrix material around the three-dimensional arrangement of woven reinforcing fibres, within the mould and around the at least one flexible hollow member, and heating and pressurizing the matrix material to consolidate and cure the composite material and to cause the foaming material to foam to provide an internal pressure to consolidate the interior of the aerofoil.

5. A method as claimed in claim 4 wherein the foaming material comprises adhesive foam.

6. A method as claimed in claim 1 wherein the method comprises weaving at least one tape of foaming material into the three-dimensional arrangement of woven reinforcing fibres as a warp or a weft, heating and pressurizing the matrix material to consolidate and cure the composite material and to cause the foaming material to foam to provide an internal pressure to consolidate the interior of the aerofoil and to define the cavities.

7. A method as claimed in claim 6 wherein the foaming material comprises adhesive foam.

8. A method as claimed in claim 1 wherein the matrix material is a resin.

9. A method as claimed in claim 8 wherein the matrix material is an organic resin.

10. A method as claimed in claim 1 wherein the reinforcing fibres comprise carbon fibres.

11. A method as claimed in claim 1 wherein the method comprises heating and pressurizing the matrix material to consolidate and cure the composite material.

12. A method as claimed in claim 1 wherein the composite aerofoil is selected from the group comprising a fan blade, a fan outlet guide vane, a compressor blade, a compressor vane, a propeller blade, a helicopter blade, a ship propeller blade and a wind turbine blade.

13. A method as claimed in claim 1, wherein the plurality of cavities are spaced apart between the leading edge and the trailing edge in a direction between the leading edge and the trailing edge.

14. A method according to claim 1, comprising weaving the reinforcing fibres such that they produce an orthogonal interlock three-dimensional arrangement of reinforcing fibres.

15. A method according to claim 1, comprising weaving the reinforcing fibres such that they produce an angle interlock three-dimensional arrangement of reinforcing fibres.

16. A method of manufacturing a composite aerofoil, the composite aerofoil comprising:
a root;
a leading edge;
a trailing edge;
a concave pressure surface wall;
a convex suction surface wall; and
a tip,
the method comprising:
weaving a three-dimensional arrangement of reinforcing fibres such that a first set of reinforcing fibres extending generally longitudinally of the aerofoil from the root to the tip, a second set of reinforcing fibres extending generally chordally of the aerofoil from the leading edge to the trailing edge, and a third set of reinforcing fibres having portions extending generally chordally of the aerofoil and portions extending transversely to the first set of reinforcing fibres and to the second set of reinforcing fibres, the third set of reinforcing fibres crossing and interlocking with the first set of reinforcing fibres and the second set of reinforcing fibres, the three-dimensional arrangement of woven reinforcing fibres defining a plurality of cavities, the plurality of cavities being spaced apart between the leading edge and the trailing edge, the composite aerofoil comprising at least one web extending between, and being secured to, the concave pressure surface wall and the convex suction surface wall to produce a Warren girder structure, the three-dimensional arrangement of woven reinforcing fibres being arranged to produce the concave pressure surface wall, the convex suction surface wall and at least one web to produce the Warren girder structure;
infiltrating a matrix material around the three-dimensional arrangement of woven reinforcing fibres; and
heating and pressurizing the matrix material to consolidate and cure the composite material to produce the composite aerofoil.

17. A method as claimed in claim 16, wherein the third set of reinforcing fibres being arranged perpendicular to the first set of reinforcing fibres and the second set of reinforcing fibres.

\* \* \* \* \*